United States Patent
Griffoul

(10) Patent No.: US 8,064,345 B2
(45) Date of Patent: Nov. 22, 2011

(54) OPTIMISATION PROCESS OF THE CONTROL OF TRAFFIC IN A PACKET TELECOMMUNICATIONS NETWORK

(75) Inventor: Frederic Griffoul, Le Cannet (FR)

(73) Assignee: Ipanema Technologies, Fontenay-aux-Roses (FR)

( * ) Notice: Subject to any disclaimer, the term of this patent is extended or adjusted under 35 U.S.C. 154(b) by 189 days.

(21) Appl. No.: 12/440,756

(22) PCT Filed: Sep. 19, 2007

(86) PCT No.: PCT/EP2007/059915
§ 371 (c)(1),
(2), (4) Date: Mar. 11, 2009

(87) PCT Pub. No.: WO2008/034851
PCT Pub. Date: Mar. 27, 2008

(65) Prior Publication Data
US 2009/0279429 A1 Nov. 12, 2009

(30) Foreign Application Priority Data
Sep. 21, 2006 (FR) ..................... 06 53881

(51) Int. Cl.
*H04J 1/16* (2006.01)
(52) U.S. Cl. ......... 370/236; 370/229; 370/230; 370/235
(58) Field of Classification Search ............ 370/229, 370/230, 235, 236
See application file for complete search history.

(56) References Cited

U.S. PATENT DOCUMENTS

| | | | |
|---|---|---|---|
| 6,252,851 B1 * | 6/2001 | Siu et al. ....................... | 370/236 |
| 7,099,273 B2 * | 8/2006 | Ha et al. ........................ | 370/229 |
| 2004/0151113 A1 * | 8/2004 | Zakrzewski .................. | 370/230 |
| 2005/0005024 A1 | 1/2005 | Samuels et al. | |
| 2007/0076621 A1 * | 4/2007 | Malhotra et al. ............. | 370/252 |

OTHER PUBLICATIONS

International Search Report for PCT/EP2007/059915.
Dutta et al: "An Active Proxy Based Architecture for TCP in Heterogeneous Variable Bandwidth Networks" IEEE Global Telecommunications Conference, vol. 4 of 6, pp. 2316-2320. Nov. 25, 2001.

(Continued)

*Primary Examiner* — Hassan Kizou
*Assistant Examiner* — Ashil Farahmand
(74) *Attorney, Agent, or Firm* — Pearne & Gordon LLP

(57) ABSTRACT

The invention relates to a process for optimizing the control of the traffic in a packet telecommunications network comprising at least one transmitter terminal (2), at least one receiver terminal (4), and one traffic regulator (6) arranged between the transmitter terminal (2) and the receiver terminal (4), said transmitter (2) and receiver (4) terminals exchanging data packet segments via a connection-oriented link employing a transport protocol with acknowledgement of receipt.

This process comprises the following steps:
when a connection is made between the transmitter (2) and receiver (4) terminals,
intercepting, at the level of the traffic regulator (6), the packet segments sent from the transmitter terminal (2) to the receiver terminal (4),
generating an anticipated acknowledgement of receipt $ACK_a$ simulating receipt of said packet segments by the receiver terminal (4) when the traffic regulator (6) transmits the intercepted packets to the receiver terminal (4),
transmitting, from the traffic regulator (6), said acknowledgement of receipt anticipated $ACK_a$ to the transmitter terminal (2) so as to slave the sending rate of the packet segments by the transmitter terminal (2) at a rate fixed by said traffic regulator (6).

20 Claims, 9 Drawing Sheets

OTHER PUBLICATIONS

Meyer et al: "Performance Evaluation of a TCP Proxy in WCDMA Networks" IEEE Wireless Communications, vol. 10, No. 5 pp. 70-79, Oct. 2003.

Border et al: "Perfoming Enhancing Proxies Intended to Mitigate Link-Related Degradations" IETF Standard, Internet Engineering Task Force, Jun. 2001. ISSN: 0000-0003.

* cited by examiner

OPTIMISATION PROCESS OF THE CONTROL OF TRAFFIC IN A PACKET TELECOMMUNICATIONS NETWORK

TECHNICAL FIELD

The invention pertains to the domain of telecommunications and relates more specifically to process for optimizing the control of the traffic in a packet telecommunications network comprising at least one transmitter terminal, at least one receiver terminal, and a traffic regulator arranged between the transmitter terminal and the receiver terminal, said transmitter and receiver terminals exchanging data packet segments via a connection-oriented link employing a transport protocol with acknowledgement of receipt.

The invention likewise relates to a device for optimizing the control of the traffic in such a telecommunications network, and a processing unit connected to the traffic regulator of said device.

The invention relates likewise to software loaded on said processing unit comprising instructions for implementing the process according to the invention.

PRIOR ART

Known connection-oriented protocols, such as TCP (for Transmission Control Protocol) and SCTP (for Stream Control Transport Protocol) for example, enable guaranteed point-to-point exchange of data between two machines, or terminals. These protocols ensure ordered transfer without loss of data, by marking the octets with a sequential number and by providing an acknowledgement of receipt number specified in a standard header.

Generally, the detection of loss of segments is done in two ways: either by expiration of a predetermined period without any acknowledgement of receipt having been received by the transmitter, or by receipt of a number of consecutive duplicated acknowledgements of receipt greater than a predetermined critical threshold. In case of detection of loss, the supposed lost segment or segments are retransmitted. The retransmission period is calculated on the basis of the estimation of the transfer time designated as RTT (for round-trip time) of a segment to be added to the transfer time of the corresponding acknowledgement of receipt from the receiver to the transmitter.

Also, these transport protocols supply flow and congestion control mechanisms, founded on dynamic sliding windows.

The objective of the flow control is to prevent a rapid sending machine from overflowing the buffer memory of a slower receiver machine. With this aim, a receiver supplies explicitly a receipt window size in octets in the protocol header, which will be designated as rcv_wnd, (for receiver window) hereinbelow in this description. This size reflects the capacity of the buffer memory of the receiver allocated to the connection to absorb the transfer. The transport protocol utilised requires that the transmitter does not transmit more non-acknowledged rcv_wnd octets so as to avoid loss of data by the receiver.

In addition, a transmitter can not only overflow the memory of the receiver, but also saturate the capacity of the buffer memories of the intermediary nodes in the network, for example the IP router (for Internet Protocol). In this case, data are deleted by these intermediary nodes. The aim of congestion control is to find a balance between excessively abusive use of the resources of the network, resulting in substantial losses of data (and in numerous retransmissions), and under-utilisation of these resources, guaranteeing the absence of losses to the detriment of protocol transfer performances.

In the particular case of TCP/IP networks, the architecture of these networks does not support explicit signalling of the status of resources of the network to the terminals; also, the TCP protocol, which resides in these terminals, utilises an estimation algorithm of these resources.

In current standards, TCP employs detection of losses as an implicit signal of congestion in the network. The TCP transmitter maintains a congestion window, in octets, designated traditionally as cwnd, which estimates the number of non-acknowledged octets which the transmitter can inject into the network. The optimal quantity is the product of the bandwidth by the period, BDP for "bandwidth delay product".

The TCP congestion control algorithm is done in two phases: initially, the transmitter probes the network by enlarging its congestion window by the size of a segment for each acknowledgement of receipt received, until a segment is lost. This initial phase is qualified as "slow start", even though enlarging of the window is exponential. Then, the second phase, called congestion avoidance, sees the window oscillated around a balance value, by moderate growth (linear) and multiplicative decreases (the window is divided by two in the event of loss of segment).

It should be noted that the dynamic evolution of the congestion window is completely determined by the arrival rate of the acknowledgements of receipt, and thus is highly sensitive to the RTT of the connection. The transmission window of the transmitter is calculated as the minimum of the values of cwnd and rcv_wnd.

On the basis of this window, the transmitter transmits segments to its IP layer: if the data are available, and if the window is large enough, several segments are sent simultaneously, that is, one after the other. These are known as emission "bursts" characteristic of TCP transfers.

Even though TCP congestion control is considered as the mainstay of the stability of the Internet, its efficiency is recognised as suboptimal in a certain number of environments, in particular those networks exhibiting high BDP, due for example to significant RTT. Also, the utilisation of losses as signal implicit of congestion poses problems for networks with a high error rate, such as the wireless networks.

Finally, some applications have characteristics which interact poorly with TCP: this is the case of very short transactions which do not succeed in reaching the steady state of the congestion window by lack of packet to be transmitted, and which suffers from a higher than necessary latency time due to the "slow start" phase. Such applications transported over networks with a significant BDP suffer from very low performance, but the ubiquity of TCP/IP networks makes them necessary.

In the architectures of the prior art comprising a traffic regulator, the latter is generally constituted by one or more physical units deployed at the frontier between two networks of very different characteristics, for example at the border between local high-rate networks and access to a wide-area network (WAN) such as a frame relay network, an ATM or MPLS (Multiprotocol Label Switching) network or even at the level of an access point or a base station which interconnects a wireless network (Wifi or Wimax), and a wired network. The aim of traffic regulation is to equalise traffic as a function of access characteristics specific to the network or as a function of a configuration of the network respecting a Service Quality contract (SQ) with the users of the network. Traffic regulation can for example ensure allocation of part of the bandwidth available between different classes of traffic, and arbitrate simultaneous packet transmissions between flows of these classes of traffic. Smoothing thus limits flow to a configured rate, measured in number of packets per second or in number of octets or bits transmitted per second: the packets are transmitted more or less strictly as a function of the configured rate, which can notably reduce emission of continuous packet bursts. Traffic equalising processes are typically founded on the token bucket algorithm, and ordering of the packets is done by disciplines of specific service of packet queues.

In networks using TCP protocol, traffic regulation considerably reduces the continuous packet bursts, which are inherent to the TCP standard transmission mechanism. The packets are transmitted continuously one after the other by TCP, following its traffic control mechanism via sliding window. Traffic equalising introduces a set period between each packet sent, and accordingly spaces the packets too closely to one another, as a function of the sending rate allocated by the regulator.

This reduces the probability of losses of packets in the intermediary nodes, especially the IP router, since the buffer memories of the routers have fewer continuous packet bursts to absorb, thus reducing the probability of overflow of these memory buffers.

Also, if sending data segments from a TCP connection exceeds the rate allocated by the traffic regulator, these packets are delayed by this regulator. This delay boosts RTT, which is calculated per connection, which will slow down the transmission of segments by the TCP transmitter, since the latter will receive receipt acknowledgements with greater delay.

However, traffic regulation alone does not control the increase in size of the congestion window of the TCP transmitter. Since equalising traffic reduces the probability of losses in the network downstream of the regulator, the size of the congestion window of the transmitter will be even greater than in the absence of a regulator. As a consequence, the transmitter transmits bursts of greater size, causing an increase in the size of the wait queues in the regulator, or even memory overflows in the intermediary nodes upstream of the regulator. As a consequence, even though equalising traffic improves the performance of the network downstream of the regulator, it can lead to degradation of TCP performance, due to losses upstream of the regulator or in the regulator itself, due to the fact that a traffic regulator can control the time interval between the emissions from a TCP source, by slowing the data packets, but does not, as such, control the size (in number of octets) of the bursts sent by the source.

Finally, a traffic regulator does not resolve the inefficiency of TCP in its "slow startup" phase. As a consequence, even if the regulator controls the sending rate of a connection, it cannot implicitly manage the congestion control mechanism without introducing packet losses.

The aim of the invention is to overcome the drawbacks of the prior art described hereinabove.

More specifically, the aim of the invention is to optimise the interaction of the algorithms of connection-oriented transport protocols with an infrastructure network which supplies traffic regulation, either at the level of the data link layer (level 2) or at the level of the network layer (level 3), that is, IP, to optimally equalise traffic between two terminals in a telecommunications network.

EXPLANATION OF THE INVENTION

To this effect, the invention advocates a process for optimizing the control of the traffic in a packet telecommunications network comprising at least one transmitter terminal, at least one receiver terminal, and a traffic regulator arranged between the transmitter terminal and the receiver terminal, said transmitter and receiver terminals exchanging data packet segments via a connection-oriented link employing a transport protocol with acknowledgement of receipt.

According to the invention, this process comprises the following steps:

when a connection is made between the transmitter terminal and the receiver terminal,
intercepting, at the level of the traffic regulator, the packet segments sent from the transmitter terminal to the receiver terminal,
generating an anticipated $ACK_a$ acknowledgement of receipt simulating receipt of said packet segments by the receiver terminal when the traffic regulator transmits the intercepted packets to said receiver terminal,
transmitting said anticipated $ACK_a$ acknowledgement of receipt to the transmitter terminal so as to slave the sending rate of the packet segments by this transmitter terminal at a rate fixed by said traffic regulator.

The anticipated character of the acknowledgement of receipt $ACK_a$ comes from the fact that it is generated before the packet segments are received by the receiver terminal.

According to the invention, said anticipated $ACK_a$ acknowledgement of receipt is generated by a processing unit connected to said traffic regulator and presents a data format complying with the transport protocol employed for transmission of data between the transmitter terminal and the receiver terminal.

The process according to the invention preferably comprises the following steps:

estimating the BDP value representing the product of the available bandwidth by the RTT transfer period of the packet segments between the traffic regulator and the receiver terminal,
calculating the value adv_wnd representing the optimal receiving window by the receiver terminal of the packet segments sent by the transmitter terminal by means of the following formula:

$$adv\_wnd=\min(rcv\_wnd-\text{pipe\_size},\text{bdp\_estim})$$

where,
rcv_wnd illustrates a receipt window imposed by the receiver terminal,
pipe_size illustrates the number of octets not yet acknowledged by the receiver terminal, or an estimation of this number,
bdp_estim illustrates the estimated value of the product BDP,
transmitting to the transmitter terminal the value adv_wnd calculated so as to control the length of the bursts sent by said transmitter terminal.

The process thus controls the size of the bursts sent by the transmitter terminal.

The process according to the invention further comprises a step consisting of transmitting a duplicated $ACK_d$ acknowledgement to the transmitter terminal identical to the acknowledgement previously sent if at least one packet segment is not received at its position in the data flow, conforming to the ordering of packets utilised in the transmission protocol used between the transmitter terminal and the receiver terminal.

In a preferred embodiment, the process according to the invention further comprises the following steps:

intercepting the $ACK_r$ acknowledgements sent from the receiver terminal to the transmitter terminal,
filtering the intercepted $ACK_r$ acknowledgements so as to delete the acknowledgements which would appear at the transmitter terminal as duplicated acknowledgements of an $ACK_a$ previously sent by the processing unit, deducing the non-delivered segments from said $ACK_r$ acknowledgements.

According to another characteristic of the invention, the headers of the $ACK_r$ acknowledgements not deleted are modified by the processing unit for transmitting to the transmitter terminal the value adv_wnd representing the optimal receiving window by the receiver terminal of the packet segments sent by the transmitter terminal.

This allows controlling the transmission rate and the size of the bursts sent by the transmitter terminal.

Retransmission of the non-delivered packet segments is done either after receipt of a number of duplicated acknowledgements greater than a predefined critical threshold, or following expiration of a predefined retransmission period.

According to the invention, this retransmission is done under the control of the traffic regulator, and the packets retransmitted to the receiver terminal are sent according to the sending rate fixed by this traffic regulator.

The process according to the invention is executed by a device comprising at least one transmitter terminal, at least one receiver terminal, and a traffic regulator arranged between the transmitter terminal and the receiver terminal, said transmitter and receiver terminals exchanging data packet segments via a connection-oriented link employing a transport protocol with acknowledgement of receipt.

According to the invention, the regulator is coupled to a processing unit comprising means for generating an $ACK_a$ anticipated acknowledgement of receipt configured to simulate receipt of the packet segments by the terminal on sending of a packet by said traffic regulator.

The processing unit is a unit with states comprising a memory for storing a control structure by connection, the state of the connection, the parameters of said connection and the retransmission queue of the packet segments not yet acknowledged by the receiver terminal.

In a particular application, the transmitter and receiver terminals communicate according to TCP transmission protocol and the processing unit comprises a module supporting the error and retransmission detection mechanisms of the TCP protocol.

Also, said processing unit comprises:
means for intercepting the $ACK_r$ acknowledgements sent from the receiver terminal to the transmitter terminal,
means for deducing the non-delivered segments from said $ACK_r$ acknowledgements,
means for filtering the $ACK_r$ acknowledgements so as to delete the acknowledgements which would appear at the transmitter terminal as duplicated acknowledgements of an $ACK_a$ previously sent by the processing unit.

The processing unit likewise comprises means for modifying the headers of the $ACK_r$ acknowledgements not deleted so as to control the transmission rate and the size of the bursts sent by the transmitter terminal.

The process according to the invention is carried out by software loaded on a processing unit associated with a traffic regulator in a packet telecommunications network comprising at least one transmitter terminal, at least one receiver terminal, said traffic regulator being arranged between the transmitter terminal and the receiver terminal, said transmitter and receiver terminals exchanging data packet segments via a connection-oriented link employing a transport protocol with acknowledgement of receipt.

Said software comprises instructions for generating an anticipated acknowledgement of receipt $ACK_a$ simulating the receipt of said packet segments by the receiver terminal, on sending of said packet segments by the traffic regulator.

The software according to the invention further comprises:
instructions for intercepting the acknowledgements $ACK_r$ sent from the receiver terminal to the transmitter terminal,
instructions for deducing from the intercepted acknowledgements $ACK_r$ the non-delivered segments,
instructions for filtering the $ACK_r$ acknowledgements so as to delete the acknowledgements which would appear at the transmitter terminal as duplicated acknowledgements of an $ACK_a$ previously sent by the processing unit.

Preferably, this software further comprises instructions for modifying the headers of the $ACK_r$ non-deleted acknowledgements for transmitting to the transmitter terminal a value adv_wnd representing the optimal receiving window by the receiver terminal of the packet segments sent by the transmitter terminal so as to control the transmission rate and the size of the bursts sent by said transmitter terminal.

BRIEF DESCRIPTION OF THE DIAGRAMS

Other characteristics and advantages of the invention will emerge from the following description, taken by way of non-limiting example, with reference to the attached figures, in which:

FIG. 1 schematically illustrates a device in which the process according to the invention is implemented;

FIG. 2 illustrates a detailed view of an acknowledgement of receipt administration unit according to the invention;

FIGS. 3 to 5 schematically illustrate the flow paths exchanged between a transmitter terminal and a receiver terminal via the device of FIG. 1, FIG. 6 illustrates an organigram illustrating traffic regulation according to the process of the invention;

DETAILED EXPLANATION OF PARTICULAR EMBODIMENTS

The invention will be described, by way of example, in an application of the process to a TCP link (for Control Transmission Protocol) between a transmitter 2 and a receiver 4 in a telecommunications network. It is to be noted that, the process may apply whatever the type of transmission protocol utilised between the transmitter 2 and the receiver 4 without departing from the scope of the invention. For greater clarity transmitter will designate the remote machine which transmits segments of data and receiver will designate another machine connected to the transmitter which transmits in return only segments of acknowledgement of receipt, or "ACK", to said transmitter.

It is to be noted that the same machine can simultaneously be a transmitter and a receiver for the same connection.

Figure 1:
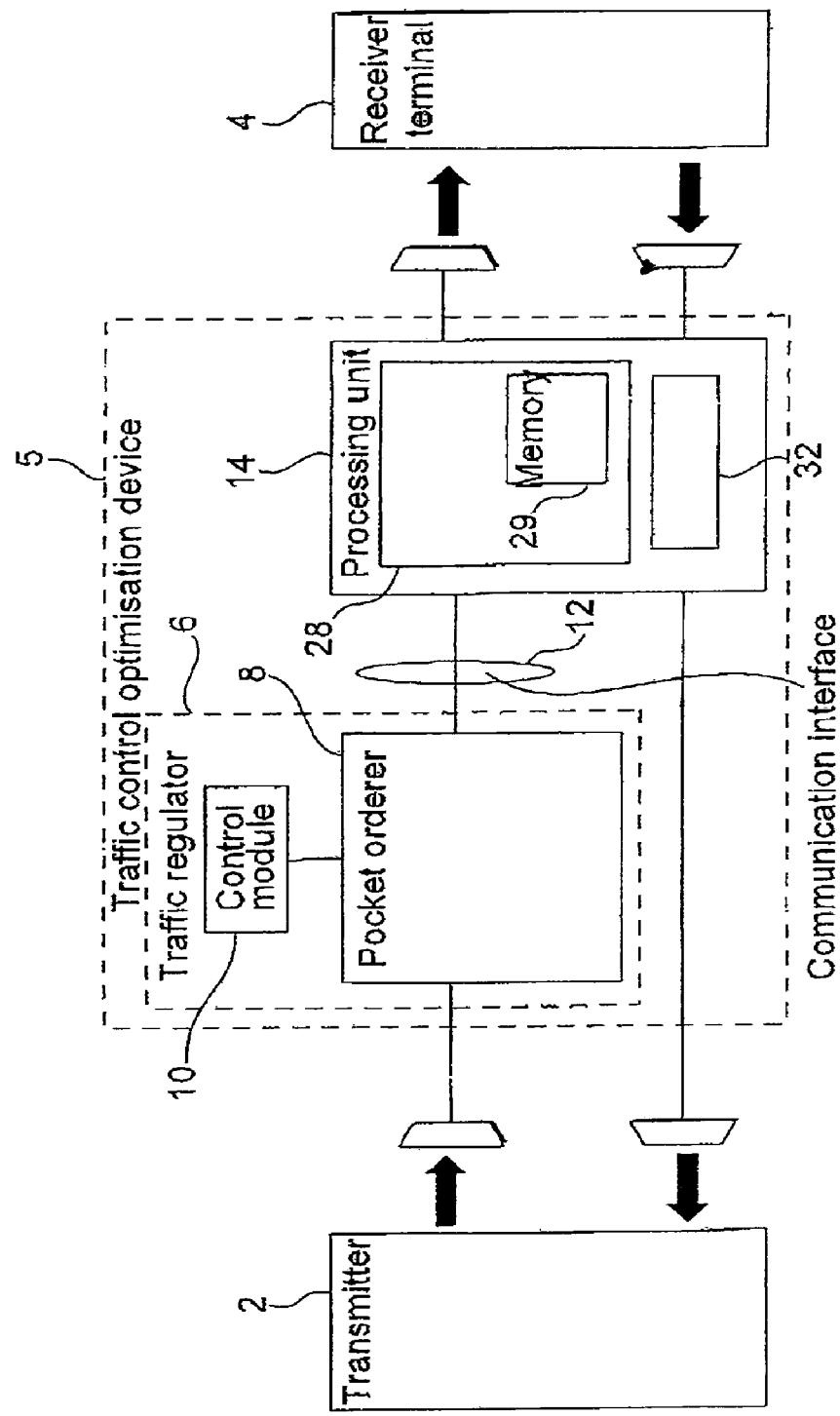

FIG. 1 illustrates a link between the transmitter 2 and the receiver 4 via a traffic control optimisation device 5.

"Upstream network" can designate the part of the network between the transmitter 2 and the device 5, and "downstream network" the part between the device 5 and the receiver 4.

Similarly, an upstream segment (resp. packet) is a segment (resp. packet) transported from the upstream part of the network, thus from the transmitter 2, to the "downstream" part, thus to the receiver 4, a "downstream" segment (resp. packet) is a segment (resp. packet) transported from the "downstream" part of the network, thus from the receiver 4, to the "upstream" part, thus to the transmitter 2.

The device 5 can interact with the terminals 2 and 4, irrespective of the receipt and transmission format of the packets on the "upstream and downstream" input/output interfaces. It can act at the level of the layer 2 (MAC, for Medium Access Control) or/and of the layer 3 (IP, for Internet Protocol) and beyond, without departing from the scope of the invention. Such a device can be centralised, that is, constituted by a single physical element, such as a network adapter, a filtering bridge, a switch, a router, an access point or a wireless base station, or a software element such as a device driver operating on a TCP host.

Alternatively, the device can be distributed on several physical network elements.

In reference to FIG. 1, the device 5 comprises a traffic regulator 6 comprising a packet orderer 8 and a control module 10. The traffic regulator 6 is connected via a communications interface 12 to a processing unit 14 comprising means for generating an anticipated acknowledgement of receipt $ACK_a$ simulating receipt by the receiver terminal 4 of the packet segments sent by the transmitter terminal 2 when the traffic regulator 6 transmits packet segments to the receiver terminal 4.

The function of the control module 10 is to dynamically adapt the parameters of the traffic regulator 6 as a function of a ready traffic administration policy in an external network unit or perceived conditions of the network.

Figure 2:
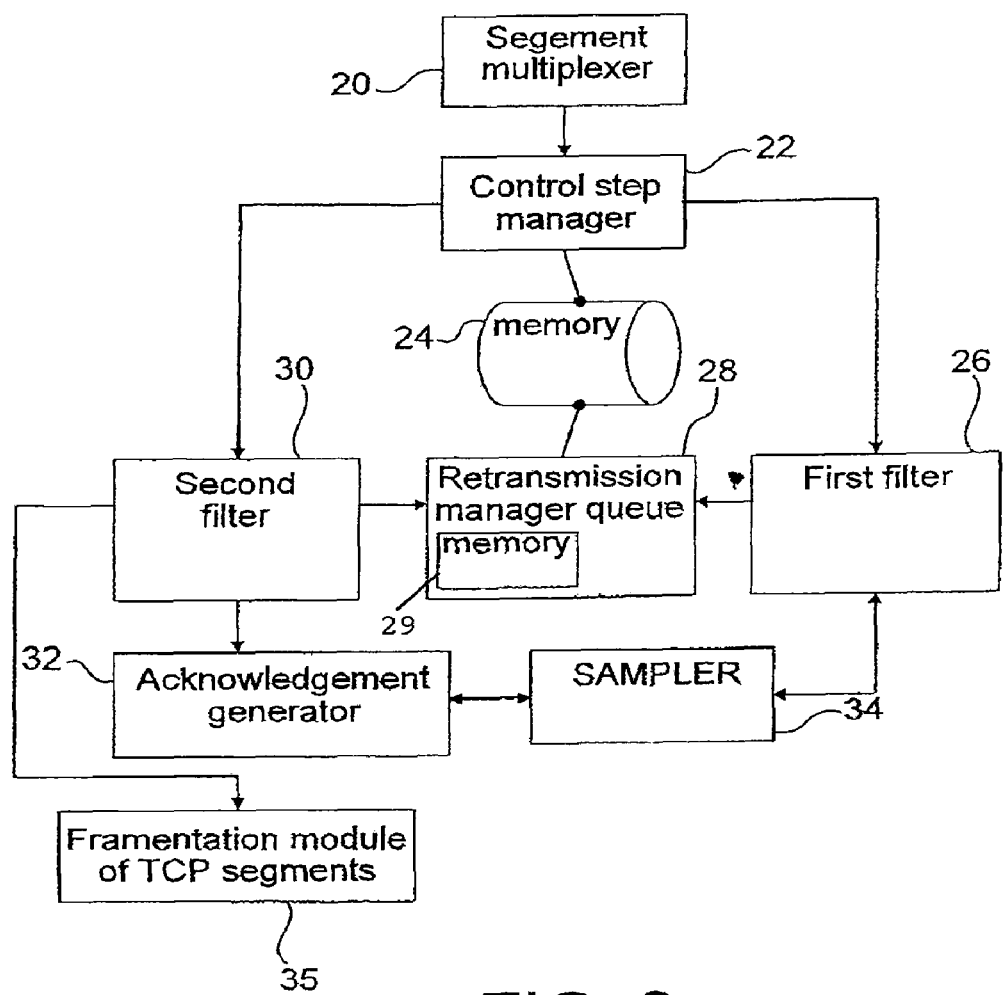

FIG. 2 illustrates the processing unit 14 in detail.

Preferably, the latter comprises:
- a segment demultiplexer 20 for extracting the necessary information from the TCP and IP headers of the packet received, whether a level screen 2 (data link layer) or an IP level datagram 3, and optionally recombine the fragmented IP packets to have all the TCP segments;
- a manager for control steps 22.

For each connection, the current status is loaded into a memory 24 in the form of a structure known as control step, with the queue of the segments not acknowledged, and any other information necessary for completing detection of losses and retransmission conform with TCP standards.

The manager of the control steps 22 is for creating, recovering and destroying the control steps in this memory 24. The association between a connection and the memory address of the corresponding control can be made by means of appropriate data structure such as a balance tree or a hashing table. The identifier of a control step can be either a level "tag" 2 or the quadruplet <IP source address, IP destination address, TCP source port, TCP destination port> extracted from the TCP and IP headers.

The unit 14 further comprises a first filter 26 for filtering the upstream segments. This component is utilised only in processing segments sent by the transmitter terminal to the receiver terminal. It supplies various verifications on the header and the TCP segment extracted by the demultiplexer 20. In particular, this filter verifies whether the TCP segment transports data or not. If not, the segment is a pure acknowledgement which must not be acknowledged in turn, and this segment can be ignored by the processing unit 14, then transmitted to the receiver terminal 4. This filter 26 likewise verifies whether the checksum of the TCP segment is valid or not. If not, the segment is deleted. It also verifies whether the segment is duplicated or not, that is, if the segment is a retransmission of the transmitter terminal 2. If yes, the segment is deleted.

In all other cases, the segment is passed to a retransmission manager queue 28 for the remainder of the upstream processing.

The unit 14 further comprises a buffer memory 29 connected to the retransmission manager queue 28. This component supplies the core of the TCP error and retransmission detection mechanism, by not considering any TCP control congestion mechanism. In fact, as the processing unit 14 transmits anticipated acknowledgements to the transmitter 2, the responsibility for correct and ordered delivery of the acknowledged segments lies with the retransmission manager queue 28.

For upstream segments, this component keeps a copy of each segment transmitted in a queue of segments, ordered according to the sequence numbers of the segment octets.

For downstream segments, the acknowledgement of cumulative receipt number indicates the segments correctly received by the receiver terminal: the copies of these segments kept in the retransmission queue can be deleted without risk. The error detection algorithm must conform to the TCP standard for the processing unit 14 to be compatible with the TCP implantation on the receiver terminal. One or more segments are retransmitted either via the procedure known as Fast Recovery specified for the TCP "Reno" variants, that is, when the number of consecutive duplicated acknowledgements reaches a predefined critical threshold, generally three, or via the selective acknowledgement recovery procedure specified for the TCP "SACK" variants, or via the expiration procedure of a retransmission timeswitch. For this last procedure, the manager 28 must estimate the RTT of each connection to evaluate a duration for the timeswitch which is neither too short nor too long, for example conforming to the standard TCP sampling algorithm.

When segments must be retransmitted, they are placed under the control of the traffic regulator 6. To avoid any edge effect of hidden retransmissions (for example considerable underestimation of the traffic routing to the receiver terminal), the retransmission queue manager 28 has an interface with the traffic regulator 6. For example, if the traffic regulator 6 comprises wait queues by traffic class, the retransmission manager 28 places the retransmitted segments at the head of the corresponding queue, contrary to the new packets to be transmitted which are placed at the end of the queue.

The unit 14 further comprises a second filter 30 dedicated to the downstream segments. This component is used only in processing segments sent by the receiver terminal 4 to the transmitter terminal 2. It provides various verifications on the header and the TCP segment extracted by the demultiplexer 20. In particular, this filter verifies whether the acknowledgement bit (ACK) is positioned or not. If not, the segment is ignored. It likewise verifies whether the checksum of the TCP segment is valid or not. If not, the segment is deleted.

In all other cases, the segment is passed to the retransmission queue manager 28 for the remaining downstream processing.

The unit 14 likewise comprises an anticipated acknowledgement generator 32 which generates segments containing only an acknowledgement of receipt to the transmitter terminal 2, following processing of the upstream packets. If the intercepted packet contains a TCP segment which is not the one expected in the order of sequential numbers, the anticipated acknowledgement generator 32 transmits a duplicated acknowledgement, that is, the same acknowledgement as previously. This generator 32 must thus store an acknowledgement in the control of the connection step, as well as the sequential number of the next expected segment. If the intercepted packet is the one expected, the anticipated acknowledgement generator 32 constructs an acknowledgement such that it appears as though sent by the receiver terminal 4 to the transmitter terminal 2. In particular, the IP addresses and the TCP ports must be inverse relative to the intercepted packet. The sequential number of the acknowledgement is positioned at the value of the acknowledgement of receipt number of the intercepted packet. The acknowledgement of receipt number is positioned at the sequential number of the intercepted packet augmented by the length of the data TCP of the packet (i.e. the size of its useful load). Finally, the receipt window is positioned according to the formula:

$$adv\_wnd = \min(rcv\_wnd - pipe\_size, bdp\_estim)$$

where, rcv_wnd illustrates a receipt window imposed by the receiver terminal, pipe_size illustrates the number of octets not yet acknowledged by the receiver terminal, or an estimation of this number.

bdp_estim illustrates the estimated value of the product BDP.

For the downstream packets, an anticipated acknowledgement generator 32 filters the pure acknowledgements: if a pure acknowledgement of the transmitter terminal 2 to the receiver terminal results in no change in window size, and has none of the SYN, RST or FIN bits positioned in its header, the packet can be silently deleted. If the opposite applies, and if a segment of the transmitter terminal 2 to the receiver terminal 4 contains data, the component alters the TCP header of the segment by:

Modifying the acknowledgement of receipt number to place the last number sent in an anticipated acknowledgement to the transmitter terminal 2. Without this modification, the segment could be ignored as "too old" by the transmitter terminal 2, that is, the acknowledgement of receipt number is in front of the left edge of its window, or the segment could even be considered as a duplicated acknowledgement causing superfluous retransmissions.

Modifying the receipt window, complying with the formula hereinabove.

Fixing the checksum of the segment to take into account the two preceding modifications.

Given the calculation algorithm, the sum can be fixed incrementally, without recalculating it over the entire TCP segment.

The unit 14 also comprises a sampler of BDP 34. This component estimates the BDP of each connection from the sampling of the RTT necessary for the retransmission mechanism. If the regulator 6 supplies queue administration via TCP connection and offers an interface for recognising the rate configured for each queue, the BDP can be sampled by directly multiplying the rate of the queue of the connection by the RTT of the connection. It is supposed that the rate in the "downstream" part of the network is entirely restricted by the rate of the regulator. If such a calculation is not possible, the BDP can be sampled by measuring the length of the retransmission queue, in octets. A dedicated sequential number is kept in the control step, and the maximal size of the retransmission queue is measured until this sequential number is acknowledged by acknowledgement of receipt of the transmitter terminal 2. The BDP can then be estimated as an average of these samples. Such a procedure is similar to the sampling standard of the RTT in the absence of a "Timestamp" option.

The unit 14 also comprises a fragmentation module of the TCP segments 36, the function of which will be described hereinbelow.

A particular problem in the case of application of the process according to the invention in an IP network is the support of the discovery of the MTU (for Maximum Transmit Unit, representing the maximal size (in octets) of the packet to be transmitted once only).

According to current standards intermediate routers between two machines implanting the TCP protocol delete an IP packet whereof the size exceeds the maximal authorised size on an interface (MTU) and whereof the flag "Including fragment" of the IP header is present. Also, the router transmits to the source an ICMP message (for Internet Control Message Protocol) containing the value of the MTU on the interface considered.

If such a router is located downstream of the processing unit 14, the transmitter 2 will receive one or more anticipated acknowledgements for segments which later will be deleted by the router.

In fact, if the unit functions at the IP level, and if the MTU is fixed dynamically in the network, the processing unit 14 can anticipate acknowledgement for segments which will be deleted by a downstream router, with emission of an ICMP packet (for Internet Control Message Protocol) specifying the value of the MTU on the path considered. This ICMP packet must reach the transmitter terminal 2 which will afterwards transmit packets at the adapted size.

However if the processing unit 14 fails also to intercept this ICMP packet, the retransmission procedure leads to resending of the packets deleted by the router without considering the MTU: the retransmissions will thus be deleted again by the router and will never reach the receiver terminal 4. The fragmentation module of the TCP segments 36 is thus responsible for interception of the ICMP packets indicating a dynamic MTU, and for fragmentation of the acknowledged segments according to the MTU sent by the downstream router. These segments are then immediately retransmitted to the receiver terminal 4 by the retransmission manager 28.

According to a characteristic of the invention, the processing unit 14 intercepts the ICMP messages of type "path mtu discovery" to retransmit the lost segments of the impacted connections, by fragmenting these segments to the size of the MTU supplied (even if the IP packets have the flag "Including Fragment" positioned). Then just as the transmitter 2 has not been informed by the ICMP message, the processing unit 14 fragments the acknowledged segments locally.

In order to support the TCP protocol, the processing unit 14 comprises the following logical interfaces:

TS_requeue (TS_queue q, TS_packet p): intended to insert the parameters of the packets at the start of the queue of the packet to be transmitted to the receiver terminal 4.

TS_rate (TS_queue q): This interface is optional and is intended to return the current transmission rate of the queue parameters, TS_availspace (TS_queue q): This interface is optional and is intended to return the available quantity of the buffer memory of the queue. It is evident that this interface is not necessary if the system is distributed between different physical devices, in particular if the traffic regulator 6 and the processing unit 14 are integrated into different network devices.

The different phases of the process according to the invention will now be described with reference to FIGS. 3, 4 and 5.

Figure 3:
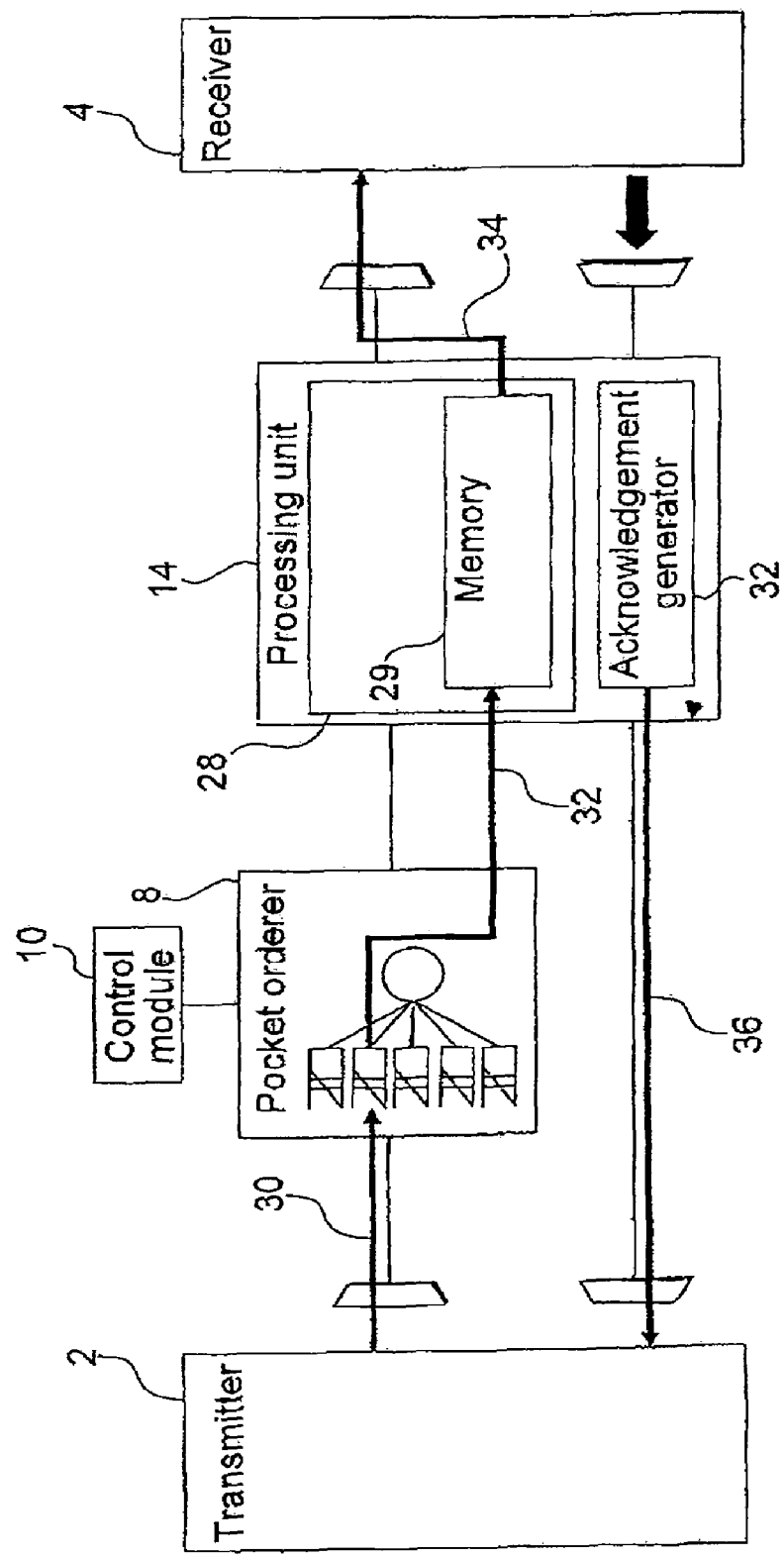

FIG. 3 schematically illustrates processing packet segments of an upstream flow sent by the transmitter terminal 2.

These segments are first intercepted by the traffic regulator 6, which classifies them and arranges them in an appropriate buffer memory (arrow 30).

The traffic regulator 6 then selects the segment to be transmitted to the receiver 4 and delivers it to the processing unit 14 (arrow 32). The segment is then transmitted without delay and without modification to the receiver terminal 4 via the downstream network (arrow 34).

If the TCP segment transports useful data, the processing unit 14 generates an acknowledgement of receipt ACK which it transmits (arrow 36) to the transmitter terminal 2.

Figure 4:
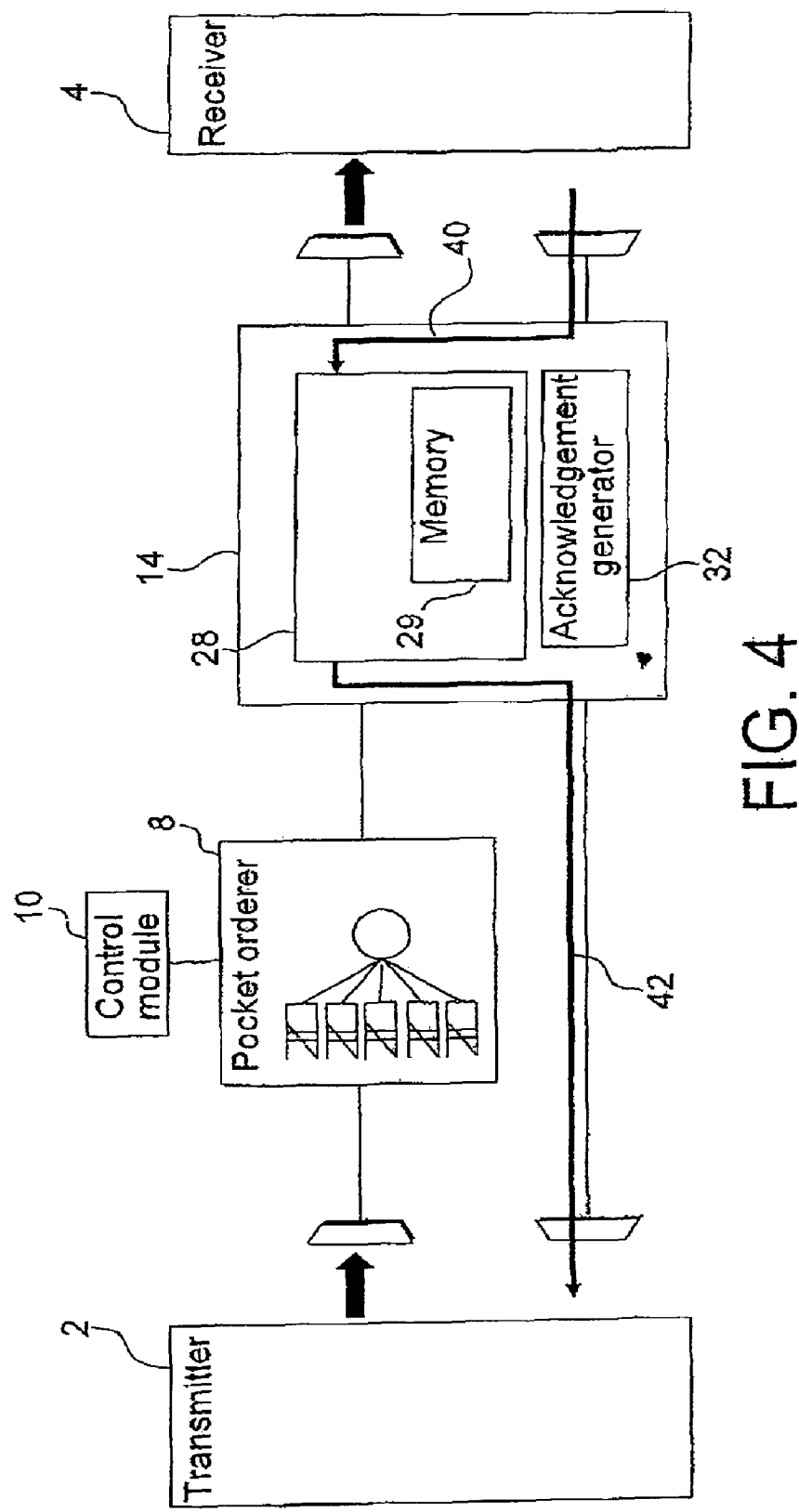

FIG. 4 schematically illustrates processing packet segments of a downstream flow sent by the receiver terminal 4.

The latter are first intercepted by the processing unit 14 (arrow 40) which filters them, modifies the headers of the packets not deleted then transmits these packets (arrow 42) to the transmitter terminal 2 with the value adv_wnd.

Figure 5:
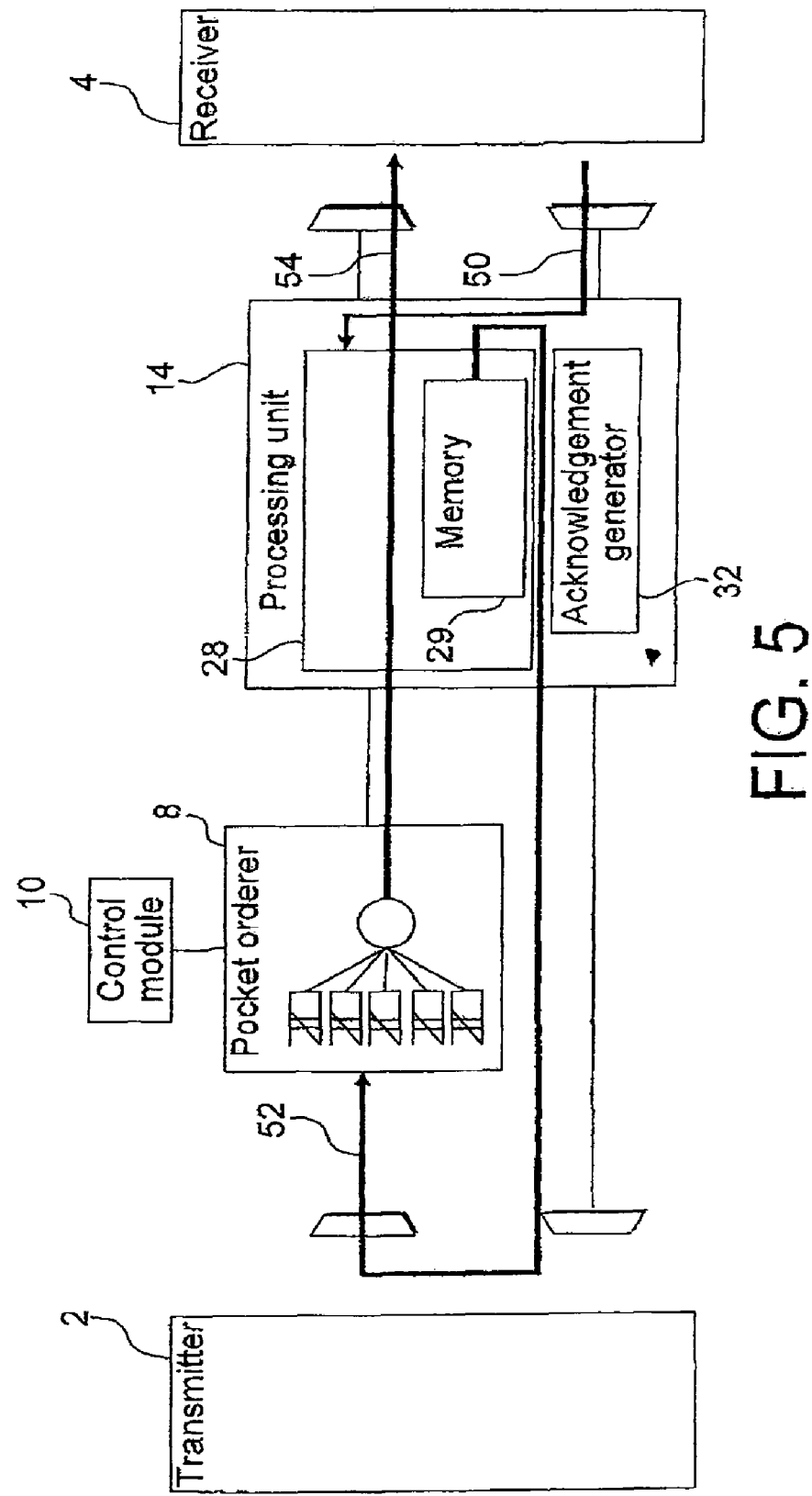

FIG. 5 schematically illustrates retransmission of packets to the receiver terminal 4.

It is noted that retransmission is conducted either after receipt by the processing unit 14 of a number of duplicated acknowledgements greater than a predefined critical threshold, or following expiration of a predefined retransmission period.

When the processing unit 14 receives a duplicated acknowledgement of receipt greater than a critical threshold (arrow 50), or following expiration of the predefined retransmission period, the administration module of the retransmissions 28 of the unit 14 selects one or more segments which must be retransmitted. This procedure will be described in detail in the following description.

A segment which must be retransmitted is sent back to the input of the traffic regulator 6 (arrow 52) which positions it at the head of the retransmission buffer memory. When the segment is selected by the packet orderer 8 of the traffic regulator 6, it is supplied directly to the interface of the downstream network without additional processing in the processing unit 14 (arrow 54).

The different processing steps of the upstream and downstream segments carried out in application of the process of the invention will now be described with reference to FIGS. 6 to 9.

Processing Upstream Packets

Figure 6:
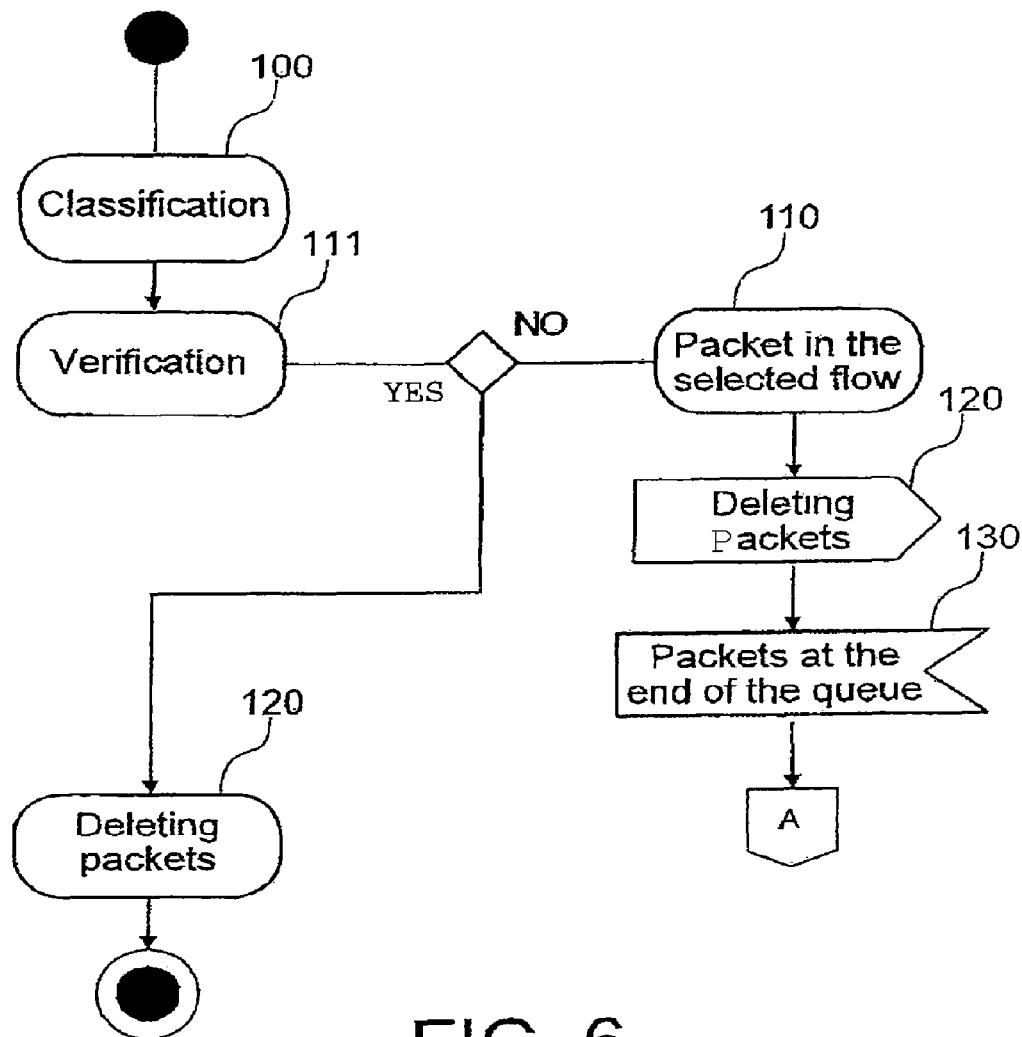

The steps for processing upstream segments are described hereinbelow with reference to FIG. 6.

In step 100, the traffic regulator carries out classification of the flows received from the transmitter terminal 2. This classification consists of sorting the packets into predefined traffic flow and applying particular processing to each flow. Thus for example, part of the bandwidth available can have been reserved for a flow, or else a flow can be subjected to a time or jitter constraint. The parameters utilised for the classification depend on the level of processing of the traffic regulator 6. In fact, if the regulator 6 is bound to the data link layer (level 2), a simple virtual circuit or channel identifier can suffice, but on the contrary if this regulator 6 acts at the IP level, the classification can utilise a combination of fields of the IP header, or even of the TCP or UDP header, or even the relevant content of the packet (level 7).

In general, the effect of classification is to place the packet in a queue dedicated to the selected flow (step 110), and adapted service discipline is applied to the queue. In step 111, verification is made as to whether the queue has any more memory space.

If yes, appropriate processing is executed at step 120 for deleting one or more packets.

If not, the packet is placed at the end of the queue and the classifier signals a packet orderer (step 130).

The packet orderer 8 then selects the next packet to be transmitted from among the eligible flows. The selected packet is then transmitted to the processing unit TCP 14.

Generation of Acknowledgement of Receipt by the Unit 14

Recall that the function of the processing unit TCP 14 is to generate an acknowledgement of receipt (ACK) and to transmit this acknowledgement of receipt to the transmitter terminal 2 independently of the transmission period of the packet in the downstream part of the network, so as to slave the sending rate of this terminal 2 to the corresponding flow rate in the traffic regulator 6.

Figure 7:
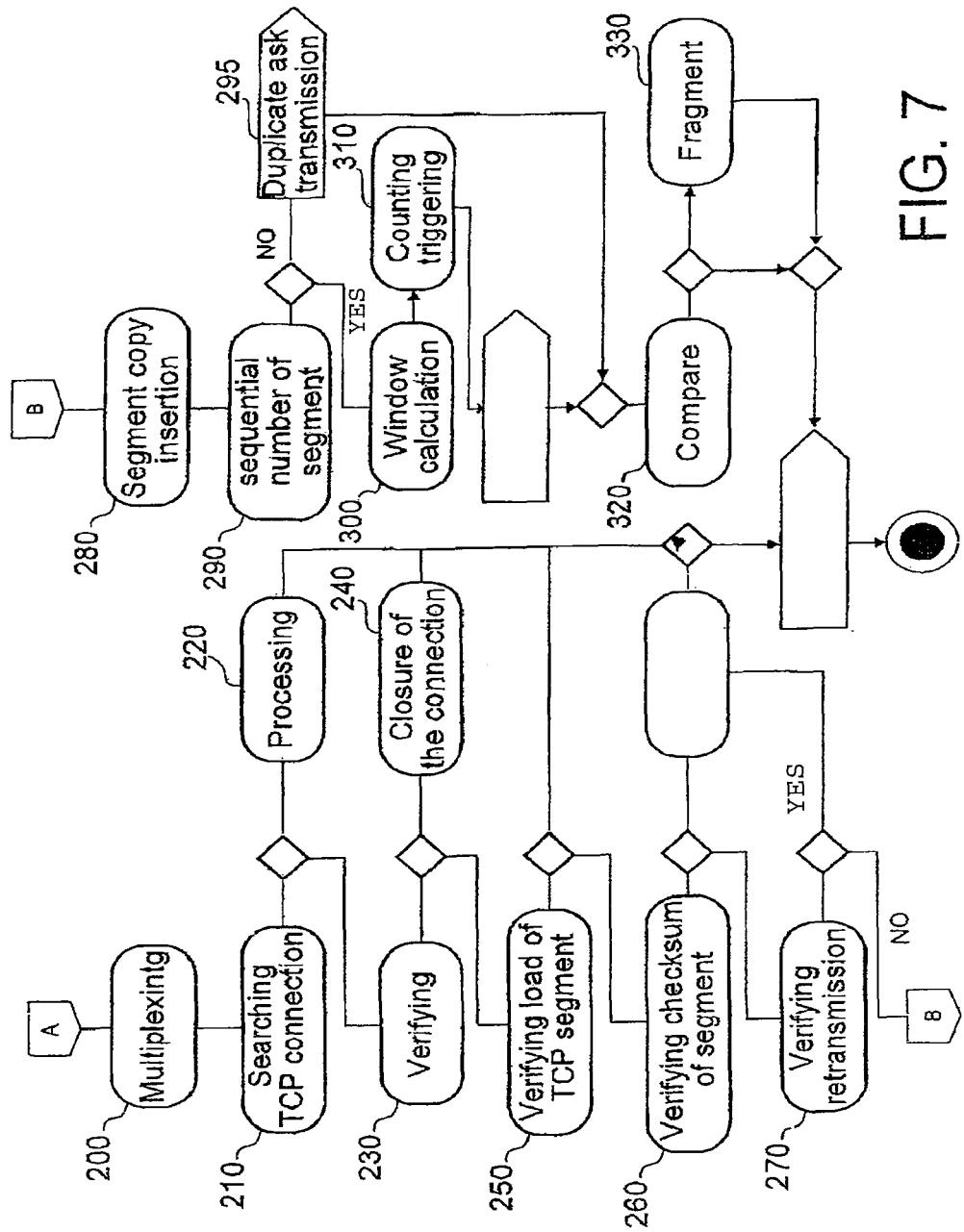
FIG. 7 illustrates an organigram illustrating the processing of an upstream flow (between the processing unit and the transmitter) according to the process of the invention.

FIG. 7 is a flowchart illustrating the remaining processings applied to the upstream flow.

Step 200 is demultiplexing of the upstream flow to extract the segment therefrom, and especially the TCP header of the packet received. This step filters the invalid packets or not TCP packets and depends on the level of processing of the traffic regulator 6. In fact, if the regulator 6 acts at level 2, the step must first extract and verify a valid IP header.

Step 210 consists of searching for the control structure of the connection TCP connected to the TCP segment during processing in the memory 24. This step can utilise any adequate data structure for carrying out an exact search as a function of the quadruplet (IP address source, IP address destination, TCP port source, TCP port destination).

If this structure does not exist or is not in the "ready" state, the readying phase of the connection is not yet complete and the segment is processed at step 220 according to the TCP 3WHS procedure (for three-way handshake). This procedure consists of verifying the validity of the readying procedure, especially the SYN and ACK sequence numbers, and stores the TCP options negotiated during this phase which impact the retransmission mechanism, especially the window scale factor for correctly calculating the window offered by the receiver 4 and the SACK support (selective acknowledgement). If the procedure or the state of connection is not deemed valid, this connection will be ignored and its control structure liberated. In particular, if the processing unit 14 fails to intercept the two directions of a connection utilising asymmetrical routes, for example, the segments of this connection will be ignored. No anticipated acknowledgement of receipt will be generated for an SYN segment so as not to desynchronise the state of connection in the remote machines.

When the connection is in the "ready" state, step 230 consists of verifying the presence of the FIN and RST flags in the TCP header: these mark the closure of the connection, and the control structure could be freed (step 240) as soon as the retransmission queue is empty. The upstream packets for the connection will be ignored from then on. In particular, the method generates no local ACK for a FIN segment (nor RST), so as not to desynchronise the state of the connection in the remote machines.

The steps described hereinbelow filter the TCP segments to be ignored:

Step 250 consists of verifying whether the useful load of the TCP segment is zero.

If yes, the segment is a pure ACK which must not be acknowledged in turn, and the segment is ignored.

Step 260 consists of verifying the checksum of the segment. If the sum is invalid, the remote machine will ignore the segment in the TCP stack.

The segment can be ignored or deleted as a function of this verification.

Step 270 consists of verifying whether the segment is retransmitted by the transmitter terminal 2 in comparing the sequential number of the last octet with the next expected sequential number, for example.

A segment retransmitted by the transmitter terminal 2 must be deleted.

At this level, the TCP segment transports octets not yet intercepted by the processing unit 14: the segment can thus be transmitted to the receiver 4.

Step 280 consists of inserting a copy of the segment in the retransmission queue. This queue is ordered by the sequential number of the octets of the segments.

If the sequential number of the segment is not the one expected, i.e. the segment received is not in sequence (step 290), one or more segments can have been lost in the upstream part of the network. The processing unit 14 then transmits (step 295) a duplicated acknowledgement to the transmitter terminal 2, that is, exactly the same acknowledgement as sent previously.

If the SACK option were negotiated between the transmitter and receiver terminals, this acknowledgement can contain SACK steps indicating the last segments received, in accordance with the TCP standard.

The TCP stack implanted in the transmitter 2 will retransmit the missing segments, if necessary, as a function of the negotiated retransmission mechanism (SACK or Reno).

If the sequential number of the segment is the one expected, the processing unit 14 transmits an anticipated acknowledgement of receipt to the transmitter 2. This acknowledgement is falsified to be received and processed by the transmitter 2 as if it had been sent by the receiver 4. In particular, the sequential number of the acknowledgement is the sequential number of acknowledgement of receipt of the upstream segment, and the sequential number of acknowledgement of receipt covers the last octet copied in the retransmission queue.

The problem therefore remains the receipt window used for TCP flow control. This is the reason for which the process according to the invention comprises a step consisting of estimating the BDP product of the value of the bandwidth by the period of the connection (Bandwidth-Delay Product, BDP).

By indicating an estimation of the BDP, designated as bdp_estim, in the receipt window of the segments sent to the transmitter 2 (including the anticipated acknowledgements), it is possible to control the length of the bursts sent by the transmitter 2. However, it is likewise important to respect the window restriction of the receiver 4, designated as rcv_wnd, to prevent overflowing its buffer memory allocated to the connection. The indicated window must finally take into account the number of octets not yet acknowledged, denoted as in_flight, and which either circulate in the downstream network or are loaded into the buffer memory of the receiver 4.

In a first variant, the value in_flight is considered as equal to the length of the retransmission queue, even though it is possible to refine this estimation based on procedures for detection of errors and estimation of the TCP RTT. The window indicated at the TCP source is thus calculated at step 300 by the following formula:

$$adv\_wnd = \min(rcv\_wnd - in\_flight, bdp\_estim).$$

Finally, the window in question should not cause overflow of the queue of the flow in the traffic regulator 6, to prevent any loss in the system.

Preferably, the memory size of the wait queues of the regulator 6 is not undersize, given the BDP of the TCP connections.

Step 310 consists of managing the triggering of counting the wait time of the RTO acknowledgements and estimating the RTT and the BDP in acknowledgement segment and receipt transmission phase (ACK). This step 310 will be described in greater detail hereinbelow.

At step 320, the processing unit 14 compares the size of the acknowledged segments to that of the MTU.

At step 330, the processing unit 14 fragments the acknowledged segments in anticipation and whereof the size is greater than the MTU (step 320). This fragmentation is done at the level of the IP layer.

Note that with the exception of the fragmented packets, the transmitted upstream packets undergo no modification to the IP headers. The TCP headers are not modified in any case.

Processing Downstream Packets

Processing by the unit 14 of the downstream packets consists both of scanning the TCP acknowledgements sent by the receiver 4 to the transmitter 2 to detect the non-delivered segments and retransmit these segments according to TCP standard procedures, and also of modifying the TCP headers of the segments to control the rate of the transmitter 2.

Figure 8:
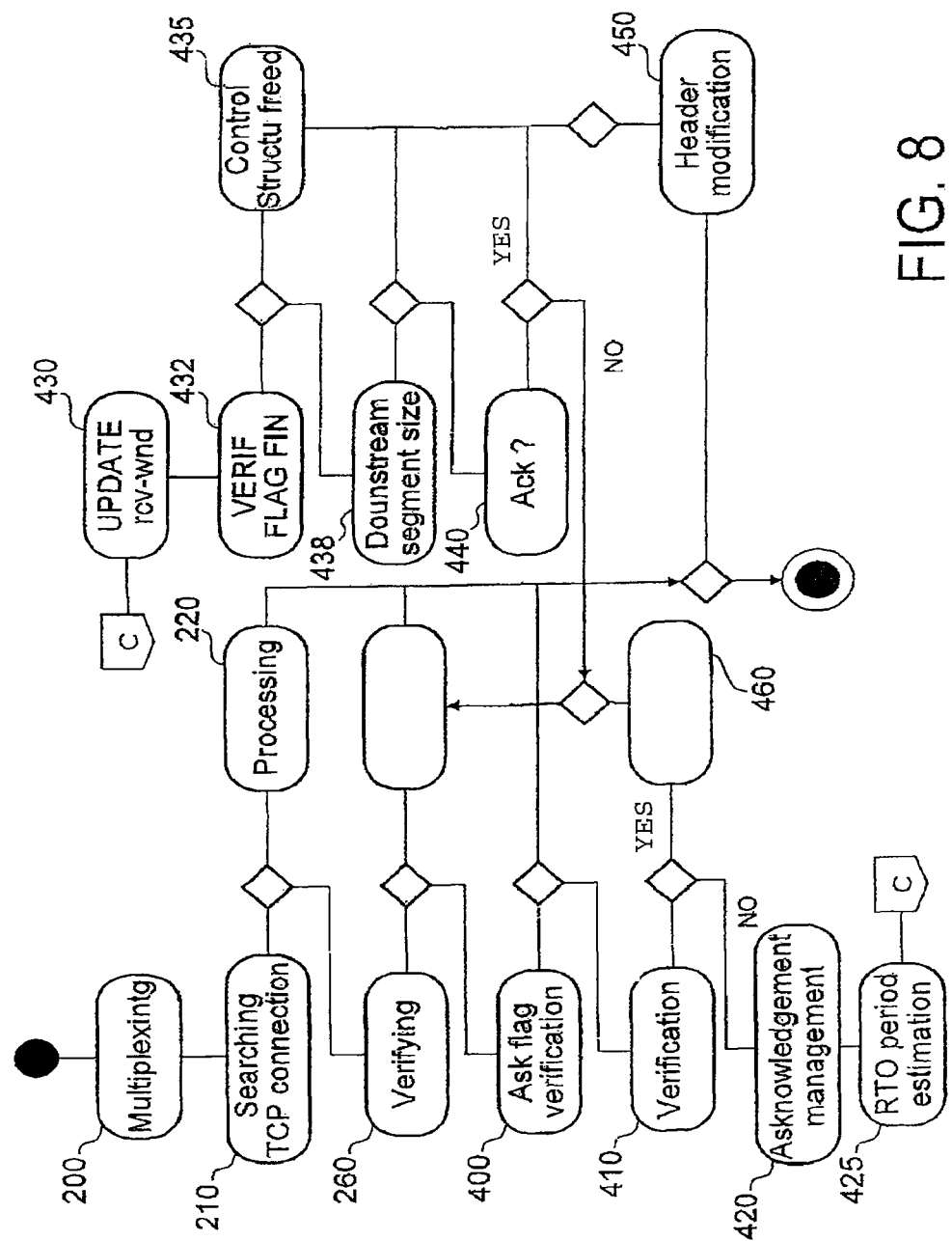
FIG. 8 illustrates an organigram illustrating the processing of a downstream flow (between the receiver and the processing unit) according to the process of the invention.

These processing steps will be described in detail with reference to FIGS. 8 and 9.

Downstream processing comprises the same steps 200, 210, 220 and 260 described in the upstream processing focused on extracting a TCP segment and its control structure associated in established mode.

In the downstream processing, step 26 consists of verifying the checksum and deleting a segment whereof the sum is invalid. If the sum is valid, verification of the ACK flag is done in step 400. If the ACK flag is not positioned, the segment is ignored (in general, this is a SYN connection reopening segment).

From step 410, the method is an alleged version of the TCP protocol in receipt mode, without administration of congestion but solely with recovery on error.

Step 410 consists of verifying whether the acknowledgement of receipt ACK is duplicated, that is, if the receiver 4 offsets its receipt window or not.

Step 420 consists of managing duplicated acknowledgements of receipt ACK according to TCP New Reno and SACK standards, which can cause retransmission of one or more TCP segments.

This procedure will be described in detail hereinbelow.

Strict compatibility with New Reno or SACK retransmission standards guarantees interoperability of the system with the TCP stacks of the receiver 4 and of the transmitter 2.

If the ACK receipt is not duplicated, the memory of the octets acknowledged by the cumulative acknowledgement of receipt ACK is liberated from all the octets whereof the sequential number is strictly less than the acknowledgement of the receipt number received.

Step 425 consists of estimating and managing the periods of the RTO (and RTT) as well as the BDP.

Estimation of the RTT can either follow the TCP standard, or adapt to any new algorithm. Implantation of the method can support the "timestamp" option to refine estimation of the RTT. The RTO wait time acknowledgement is administered in accordance with the TCP standard.

The estimation of the product BDP can be done by two methods:

If the traffic regulator 6 has an interface for accessing the flow rate corresponding to the connection, the processing unit 14 utilises this interface to estimate the BDP by multiplying the flow rate, weighted by the number of TCP connections aggregated in this flow, by the average RTT.

If not, the BDP can be sampled by supervising the size of the retransmission queue. A sequential number is kept in the control structure of the connection, as well as the number of octets transmitted downstream, with the exception of the retransmitted segments, until the acknowledgement of receipt cumulative number of the downstream segments covers the specified sequential number. The BDP is estimated as a weighted average or the maximum of these numbers of transmitted octets. This is a procedure very similar to sampling of the RTT in the absence of the "timestamp" option.

The initial value of the BDP must not prevent the transmitter 2 from transmitting all the first segments of the transfer. For example, if the first anticipated acknowledgement of receipt ACK positions the window at a segment, due to the value bdp_estim, the transmitter 2 cannot transmit a complete burst if its initial congestion window is greater than one segment, as recommended by TCP standards.

According to a characteristic of the invention, the estimation of the BDP thus adds a fixed number of segments to the sampled value, for example 4 to 8 segments.

Step 430 consists of updating the value rcv_wnd of the window of the receiver 4.

As for steps 230 and 240 in the upstream processing, step 432 consists of verifying the presence of the flags FIN and RST in the TCP header marking the closure of the connection. The control structure will be freed in step 435 as soon as the retransmission queue is empty.

Step 438 consists of calculating the size of the useful load of the downstream segment.

If this size is zero, corresponding to a pure acknowledgement segment, the process continues via step 440 consisting of verifying whether the acknowledgement of receipt number or the window has evolved relative to the last ACK sent.

If such is not the case, the segment is deleted.

If it is the case, the transmitter 2 would consider the segment to be a duplicated acknowledgement, which would distort its retransmission procedure. In all other cases, the segment must be transmitted to the transmitter 2.

However, to be validated by the TCP stack of the transmitter 2, some fields of the TCP header are modified at step 450. In this respect:

The acknowledgement of receipt number must correspond to the last acknowledgement of receipt number of the anticipated ACK generated, that is, be greater than or equal to this number. Without this modification, the TCP stack of the transmitter 2 would either ignore the segment as being too old (acknowledgement of receipt number smaller than the left edge of its window) or would consider the segment as a duplicated acknowledgement.

The receipt window can be recalculated to take into account the new values of bdp_estim, rcv_wnd and in_flight.

The checksum must be fixed to take into account the two preceding modifications of the header.

Processing TCP Retransmissions

The retransmitted segments must be subjected to the traffic regulator 6 to avoid hidden retransmission edge effects on the control mechanisms of the traffic regulator 6 (for example significant underestimation of the traffic injected into the "downstream" network).

Processing of the retransmissions is described in detail by reference to FIG. 9.

Remember that segment retransmission can take place according to TCP procedures either after receipt of a number of duplicated acknowledgements greater than a critical threshold (generally three) according to TCP New Reno or SACK (step 500), which triggers a "Fast Retransmit" procedure (step 510), or following expiration of the retransmission timeswitch (step 520), indicating that no cumulative acknowledgement of receipt has been received covering the segment transmitted during the period prescribed.

Step 530 consists of sending the next segment of the retransmission queue which must be retransmitted. In general, the acknowledgement of receipt number must be modified relative to the original segment to reflect the last acknowledgement of receipt sent by the transmitter (especially in the case of truly bidirectional transfer between the two machines). This value is thus loaded in the control structure during upstream processing.

In a variant embodiment of the process according to the invention, in the case of a connection supporting the "timestamp" option, the value of the timestamp is modified for measuring the RTT even in case of retransmission or for detecting an erroneous retransmission.

Finally, the checksum is fixed to take into account these changes in the TCP header (step 540).

Figure 9:
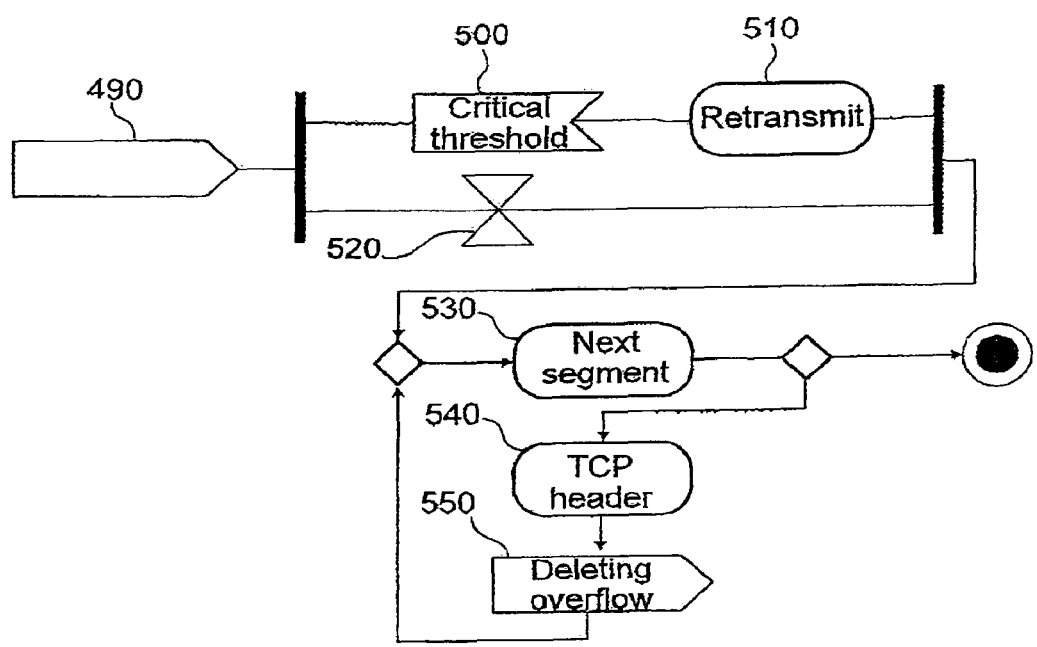
FIG. 9 illustrates an organigram illustrating administration of the retransmission of a flow according to the process of the invention.

FIG. 9 shows a segment retransmission loop in the case of the TCP SACK support, which can determine that several segments have been lost. It should be noted that retransmission of the segments does not utilise any congestion control mechanism, but depends solely on the traffic regulation stage to protect the downstream network.

In particular, once the regulator 6 has sent the retransmitted segments, any new pending segment after these retransmitted segments will be sent in turn.

It should be remembered that the traffic regulator 6 is coupled to the processing unit 14 via a communications interface for inserting a packet at the head of the queue, before any other pending packet, without deleting this packet in case of overflow (step 550).

The invention claimed is:

1. A process for optimizing traffic control in a packet telecommunications network, said network comprising at least one transmitter terminal, at least one receiver terminal, and a traffic regulator arranged between the transmitter terminal and the receiver terminal, said transmitter and receiver terminals exchanging data packet segments via a connection-oriented link employing a transport protocol with acknowledgement of receipt, wherein when a connection is made between the transmitter and receiver terminals:

the packet segments sent from the transmitter terminal to the receiver terminal are intercepted at the traffic regulator, an anticipated acknowledgement of receipt $ACK_a$ is generated to simulate receipt of said packet segments by the receiver terminal when the traffic regulator transmits the intercepted packets to said receiver terminal, then, said anticipated acknowledgement of receipt $ACK_a$ is transmitted to the transmitter terminal so as to slave the sending rate of the packet segments by the transmitter terminal at a rate fixed by said traffic regulator, wherein the process further comprises the regulator performing the steps of:

estimating the value BDP representing the product of the bandwidth available by the transfer period (RTT, Round-Trip Time) of the packet segments between the traffic regulator and the receiver terminal, calculating the value adv_wnd representing the optimal receiving window by the receiver terminal of the packet segments sent by the transmitter terminal by means of the following formula:

$$adv\_wnd = \min(rcv\_wnd - pipe\_size, bdp\_estim)$$

where,
- rcv_wnd illustrates a receipt window imposed by the receiver terminal,
- pipe_size illustrates the number of octets not yet acknowledged by the receiver terminal, or an estimation of this number,
- bdp_estim illustrates the estimated value of the product BDP, transmitting to the transmitter terminal the calculated value adv_wnd so as to control the length of the bursts sent by said transmitter terminal.

2. The process according to claim 1, in which said anticipated acknowledgement of receipt $ACK_a$ presents a data format conforming to the transport protocol employed between said transmitter and receiver terminals and is generated by a processing unit connected to said traffic regulator.

3. The process according to claim 2, further comprising a step of transmitting a duplicated acknowledgement $ACK_d$ to the transmitter terminal identical to the acknowledgement previously sent if at least one segment of packets is not received at its position in the data flow, conforming to the ordering of the packets utilised in said transport protocol.

4. The process according to claim 1, further comprising the steps of:
- intercepting the acknowledgements $ACK_r$ sent from the receiver terminal to the transmitter terminal,
- filtering the acknowledgements $ACK_r$ so as to delete the acknowledgements which would appear at the transmitter terminal as duplicated acknowledgements of an $ACK_a$ previously sent by the processing unit,
- deducing from said acknowledgements $ACK_r$ the non-delivered segments.

5. The process according to claim 4, further comprising the step of modifying by the processing unit the headers of the acknowledgements $ACK_r$ not deleted for transmitting to the transmitter terminal the value adv_wnd.

6. The process according to claim 5, in which retransmission is carried out either after receipt of a number of duplicated acknowledgements greater than a predefined critical threshold, or following expiration of a predefined retransmission period.

7. The process according to claim 6, in which retransmission of a packet is carried out under the control of the traffic regulator, and in that the sending of retransmitted packets to the receiver terminal is carried out according to the sending rate fixed by said traffic regulator.

8. The process according to any one of claims 1 to 7, in which the transmitter and receiver terminals communicate according to the transport TCP protocol.

9. The process according to any one of claims 1 to 7, in which the transmitter and receiver terminals communicate according to the protocol SCTP (Stream Control Transport Protocol).

10. An optimisation device for controlling the traffic in a packet telecommunications network, said network comprising at least one transmitter terminal, at least one receiver terminal, and a traffic regulator arranged between the transmitter terminal and the receiver terminal, said transmitter and receiver terminals exchanging data packet segments via a connection-oriented link employing a transport protocol with acknowledgement of receipt, wherein the device comprises said traffic regulator coupled to a processing unit, the processing unit comprising means for generating an anticipated acknowledgement of receipt $ACK_a$ simulating receipt by the receiver terminal of the packet segments sent by the transmitter terminal, when the traffic regulator transmits said packet segments to the receiver terminal, wherein the device comprises:
- means for estimating the value BDP representing the product of the bandwidth available by the transfer period (RTT, Round-Trip Time) of the packet segments between the traffic regulator and the receiver terminal,
- means for calculating the value adv_wnd representing the optimal receiving window by the receiver terminal of the packet segments sent by the transmitter terminal by means of the following formula:

$$adv\_wnd=\min(rcv\_wnd-\text{pipe\_size},\text{bdp\_estim})$$

where,
- rcv_wnd illustrates a receipt window imposed by the receiver terminal,
- pipe_size illustrates the number of octets not yet acknowledged by the receiver terminal, or an estimation of this number,
- bdp_estim illustrates the estimated value of the product BDP,
- means for transmitting to the transmitter terminal the calculated value adv_wnd so as to control the length of the bursts sent by said transmitter terminal.

11. The device according to claim 10, in which said processing unit is a unit with states comprising a memory for storing a control structure by connection, the state of the connection, the parameters of said connection and the retransmission queue of the packet segments not yet acknowledged by the receiver terminal.

12. The device according to claim 11, in which the transmitter and receiver terminals communicate according to the transport TCP protocol and in that said processing unit comprises a module supporting the mechanisms for error detection and retransmission of the TCP protocol.

13. The device according to claim 12, in which said processing unit further comprises:
- means for intercepting the acknowledgements $ACK_r$ sent from the receiver terminal to the transmitter terminal,
- means for deducing the non-delivered segments from said acknowledgements $ACK_r$,
- means for filtering the acknowledgements $ACK_r$ so as to delete the acknowledgements which would appear at the transmitter terminal, as duplicated acknowledgements of an $ACK_a$ previously sent by the processing unit.

14. The device according to claim 13, in which said processing unit further comprises means for modifying the headers of the acknowledgements $ACK_r$ not deleted so as to control the transmission rate and the size of the bursts sent by the transmitter terminal.

15. A processing unit associated with a traffic regulator in a packet telecommunications network, said network comprising at least one transmitter terminal, at least one receiver terminal, said traffic regulator being arranged between the transmitter terminal and the receiver terminal, said transmitter and receiver terminals exchanging data packet segments via a connection-oriented link employing a transport protocol with acknowledgement of receipt, said unit being coupled to the traffic regulator via a communications interface and comprises means for generating an anticipated acknowledgement of receipt $ACK_a$ simulating the receipt of said packet segments by the receiver terminal, on sending said packet segments by the traffic regulator, the processing unit further comprising:
- means for estimating the value BDP representing the product of the bandwidth available by the transfer period (RTT, Round-Trip Time) of the packet segments between the traffic regulator and the receiver terminal, means for calculating the value adv_wnd representing the optimal receiving window by the receiver terminal of the packet segments sent by the transmitter terminal by means of the following formula:

$$adv\_wnd = \min(rcv\_wnd - pipe\_size, bdp\_estim)$$

where, rcv_wnd illustrates a receipt window imposed by the receiver terminal, pipe_size illustrates the number of octets not yet acknowledged by the receiver terminal, or an estimation of this number, bdp_estim illustrates the estimated value of the product BDP, means for transmitting to the transmitter terminal the calculated value adv_wnd so as to control the length of the bursts sent by said transmitter terminal.

16. The processing unit according to claim 15, characterised in that it further comprises:

means for intercepting the acknowledgements $ACK_r$ sent from the receiver terminal to the transmitter terminal, means for deducing the non-delivered segments from said acknowledgements $ACK_r$, means for filtering the acknowledgements $ACK_r$ so as to delete the acknowledgements which would appear at the transmitter terminal as duplicated acknowledgements of an $ACK_a$ previously sent by the processing unit.

17. The processing unit according to claim 16, characterised in that it further comprises means for modifying the headers of the acknowledgements $ACK_r$ not deleted for transmitting to the transmitter terminal a value adv_wnd representing the optimal receiving window by the traffic regulator of the packet segments sent by the transmitter terminal so as to control the transmission rate and the size of the bursts sent by the transmitter terminal.

18. A non-transitory memory storing software for loading on a processing unit associated with a traffic regulator in a packet telecommunications network, the network comprising at least one transmitter terminal, at least one receiver terminal, said traffic regulator being arranged between the transmitter terminal and the receiver terminal, said transmitter and receiver terminals exchanging data packet segments via a connection-oriented link employing a transport protocol with acknowledgement of receipt, said software comprises instructions for generating an anticipated acknowledgement of receipt $ACK_a$ simulating the receipt of said packet segments by the receiver terminal, on sending of said packet segments by the traffic regulator, wherein the software further comprises:

a module for estimating the value BDP representing the product of the bandwidth available by the transfer period (RTT, Round-Trip Time) of the packet segments between the transmitter terminal and the receiver terminal, a module for calculating the value adv_wnd representing the optimal receiving window by the receiver terminal of the packet segments sent by the transmitter terminal by means of the following formula:

$$adv\_wnd = \min(rcv\_wnd - pipe\_size, bdp\_estim)$$

where, rcv_wnd illustrates a receipt window imposed by the receiver terminal, pipe_size illustrates the number of octets not yet acknowledged by the receiver terminal, or an estimation of this number, bdp_estim illustrates the estimated value of the product BDP, a module for transmitting to the transmitter terminal the calculated value adv_wnd so as to control the length of the bursts sent by said transmitter terminal.

19. The non-transitory memory storing software according to claim 18, wherein the software further comprises:

a module for intercepting the acknowledgements $ACK_r$ sent from the receiver terminal to the transmitter terminal, a module for deducing the non-delivered segments from said acknowledgements $ACK_r$, a module for filtering the acknowledgements $ACK_r$ so as to delete the acknowledgements which would appear at the transmitter terminal as duplicated acknowledgements of an $ACK_a$ previously sent by the processing unit.

20. The non-transitory memory storing software according to claim 19, wherein the software further comprises a module for modifying the headers of the acknowledgements $ACK_r$ not deleted for transmitting to the transmitter terminal a value adv_wnd representing the optimal receiving window by the receiver terminal of the packet segments sent by the transmitter terminal so as to control the transmission rate and the size of the bursts sent by this transmitter terminal.

* * * * *